US009818407B1

(12) United States Patent
Secker-Walker et al.

(10) Patent No.: US 9,818,407 B1
(45) Date of Patent: Nov. 14, 2017

(54) DISTRIBUTED ENDPOINTING FOR SPEECH RECOGNITION

(71) Applicant: Amazon Technologies, Inc., Reno, NV (US)

(72) Inventors: Hugh Evan Secker-Walker, Newburyport, MA (US); Kenneth John Basye, Sutton, MA (US); Nikko Strom, Kirkland, WA (US); Ryan Paul Thomas, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 157 days.

(21) Appl. No.: 13/761,812

(22) Filed: Feb. 7, 2013

(51) Int. Cl.
| | | |
|---|---|---|
| *G10L 17/00* | (2013.01) | |
| *G10L 15/28* | (2013.01) | |
| *G10L 25/78* | (2013.01) | |
| *G10L 25/87* | (2013.01) | |
| *G10L 15/04* | (2013.01) | |
| *G10L 15/14* | (2006.01) | |
| *G10L 25/24* | (2013.01) | |

(52) U.S. Cl.
CPC .............. *G10L 15/28* (2013.01); *G10L 25/78* (2013.01); *G10L 15/04* (2013.01); *G10L 15/142* (2013.01); *G10L 25/24* (2013.01); *G10L 25/87* (2013.01)

(58) Field of Classification Search
CPC ......... G10L 15/00; G10L 15/02; G10L 15/06; G10L 15/063; G10L 15/065; G10L 15/07; G10L 15/22; G10L 15/222; G10L 2015/022; G10L 2015/025; G10L 2015/027; G10L 2015/0631; G10L 2015/0633; G10L 2015/0635; G10L 2015/0636; G10L 2015/223
USPC ................................. 704/248, 256.1–256.8
See application file for complete search history.

(56) References Cited

U.S. PATENT DOCUMENTS

| | | | | |
|---|---|---|---|---|
| 5,596,680 | A | * | 1/1997 | Chow et al. ................... 704/248 |
| 5,710,865 | A | * | 1/1998 | Abe ............................... 704/248 |
| 6,937,977 | B2 | * | 8/2005 | Gerson ........................... 704/201 |
| 7,418,392 | B1 | | 8/2008 | Mozer et al. |
| 7,720,683 | B1 | | 5/2010 | Vermeulen et al. |

(Continued)

*Primary Examiner* — Richard Zhu
(74) *Attorney, Agent, or Firm* — Pierce Atwood LLP

(57) ABSTRACT

An efficient audio streaming method and apparatus includes a client process implemented on a client or local device and a server process implemented on a remote server or server (s). The client process and server process each have speech recognition components and communicate over a network, and together efficiently manage the detection of speech in an audio signal streamed by the local device to the server for speech recognition and potentially further processing at the server. The client process monitors audio input and in a first detection stage, implements endpointing on the local device to determine when speech is detected. The client process may further determine if a "wakeword" is detected, and then the client process opens a connection and begins streaming audio to the server process via the network. The server process receives the speech audio stream and monitors the audio, implementing endpointing in the server process, to determine when to tell the client process to close the connection and stop streaming audio. The client process continues streaming audio to the server until the server process determines disconnect criteria have been met and tells the client process to stop streaming audio.

10 Claims, 6 Drawing Sheets

(56) References Cited

U.S. PATENT DOCUMENTS

| | | |
|---|---|---|
| 7,774,204 B2 | 8/2010 | Mozer et al. |
| 8,099,277 B2 * | 1/2012 | Yamamoto et al. .......... 704/248 |
| 8,117,032 B2 * | 2/2012 | Charoenruengkit et al. . 704/248 |
| 8,296,133 B2 * | 10/2012 | Wang ............................ 704/215 |
| 8,700,399 B2 * | 4/2014 | Vermeulen et al. .......... 704/242 |
| 8,793,132 B2 * | 7/2014 | Itoh et al. ..................... 704/253 |
| 9,098,467 B1 * | 8/2015 | Blanksteen ............. G10L 15/22 |
| 9,208,785 B2 * | 12/2015 | Ben-David ............. G10L 15/30 |
| 9,548,053 B1 * | 1/2017 | Basye ..................... G10L 15/22 |
| 2007/0201639 A1 * | 8/2007 | Park et al. ................. 379/90.01 |
| 2009/0177461 A1 * | 7/2009 | Ehsani et al. ..................... 704/2 |
| 2011/0224987 A1 * | 9/2011 | Gierach ........................ 704/248 |
| 2014/0012573 A1 * | 1/2014 | Hung .................... G06F 1/3215 704/233 |
| 2014/0012586 A1 * | 1/2014 | Rubin .................... G10L 25/51 704/273 |
| 2014/0172953 A1 * | 6/2014 | Blanksteen ............. H04W 4/02 709/203 |

* cited by examiner

DISTRIBUTED ENDPOINTING FOR SPEECH RECOGNITION

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data which may then be provided to various textual based programs and applications.

Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

To balance between processing power and device constraints certain automatic speech recognition (ASR) systems may be distributed between devices connected in a network. In certain configurations a local device may stream audio content to a remote device for ASR processing. To conserve processing resources (network bandwidth, power, etc.), it may be desirable for devices to indicate to each other when a particular audio stream starts to contain speech for processing and when speech for processing ends (a mechanism sometimes referred to as "endpointing"). To take advantage of increased processing power typically available on remote server devices (as opposed to local devices) a server may implement endpointing in a manner as described below. In one aspect of the present disclosure, endpointing may optionally be enhanced by implementing the detection of a particular utterance that indicates the beginning of speech directed to the local device for speech processing (a mechanism sometimes referred to as "wakeword detection").

Figure 1:
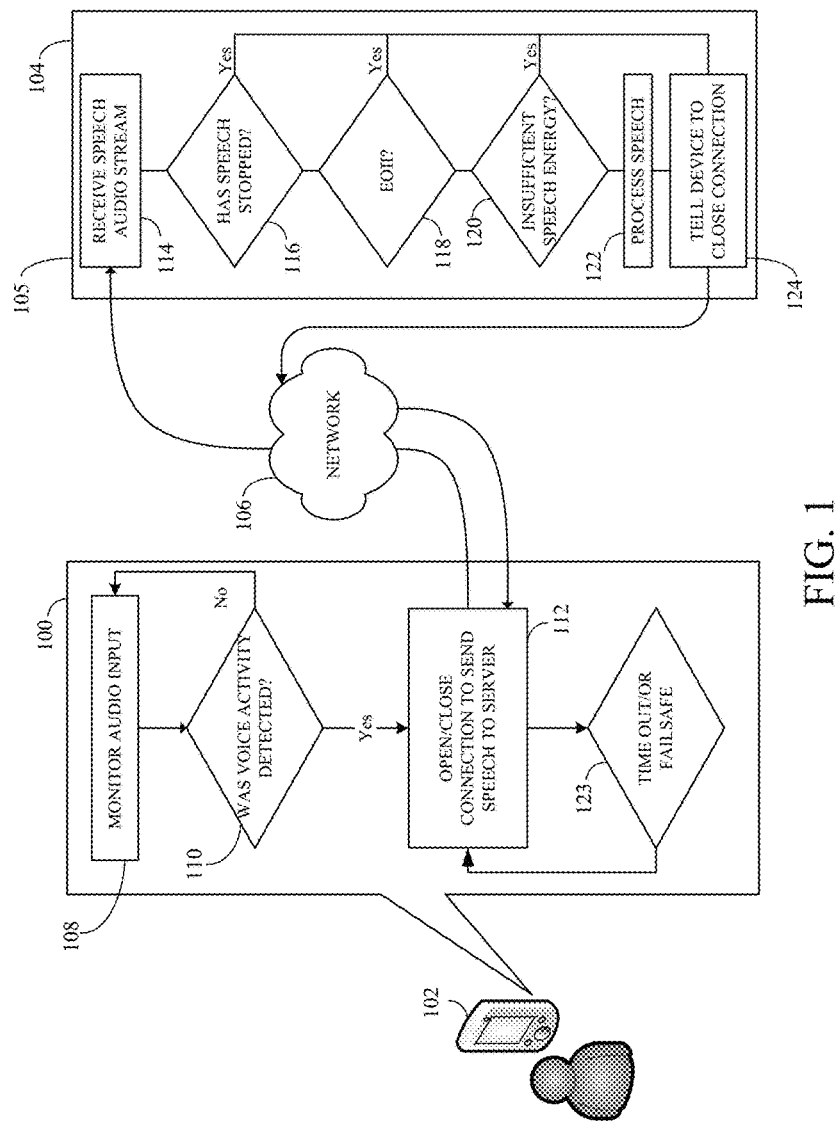
FIG. 1 illustrates an efficient audio streaming method and apparatus according to one aspect of the present disclosure.

An efficient audio streaming method and apparatus is illustrated in FIG. 1 as distributed processes, including a client process 100 implemented on a client or local device 102 such as a smart phone or other local device, and a server process 104 implemented on a remote server 105 or server(s) such as implemented "in the cloud." The client process 100 and server process 104 may each have speech recognition components, and communicate over a network 106. The local device 102 and remote server 105 together efficiently manage the detection of speech in an audio signal streamed by the local device 102 to the server 105 for speech recognition and potential further processing at the server. The client process 100 monitors audio input 108 and in a first detection stage, determines when speech is detected using procedures such as endpointing or voice activity detection 110. The client process 100 may further determine if a "wakeword" is detected indicating that the detected speech is intended to be processed by the local device 102. The client process 100 then opens a connection and begins streaming audio 112 to the server process 104 via the network 106. The server process 104 receives the speech audio stream 114 and monitors the audio, implementing endpointing in the server process 104, to determine when to tell the client process 100 to close the connection and stop streaming audio. In particular, the client process 100 continues streaming audio to the server until the server process 104 determines that disconnect criteria have been met and tells the client process 100 to stop streaming audio. The server 105 may comprise substantially more robust speech recognition capabilities than the local device 102.

The disconnect criteria that the server uses to determine that the speech stream has stopped, or that streaming audio from the local device 102 should stop may be predetermined or pre-selected, or they may be determined during processing. Such disconnect criteria may include a determination that speech in the audio stream has stopped 116, an end of interaction indication (EOII) 118 or "sleepword," a reduction in the energy level of the speech 120, or expiration of a period of time. If the server does not tell the local device to close the connection, the local device 102 may close the connection if some "failsafe" criteria has been met 123 such as expiration of a selected period of time, incomprehensibility of speech signal, or physical user interface on the local device (e.g. button). It should be appreciated that other disconnect and/or failsafe criteria may be defined. If one or a combination of disconnect criteria are not satisfied then the speech audio stream from the local device 102 continues and is processed 122 by an ASR device or server. If one or a combination of disconnect criteria are satisfied then the server process 104 tells the client process 100 to close 124 the connection and the speech audio stream from the local device 102 is stopped. Accordingly, the client process 100 on the client device 102 determines the beginning of speech transmission and the opening of the network connection and the server process 104 determines the end of speech processing and the closing of the network connection.

Figure 2:
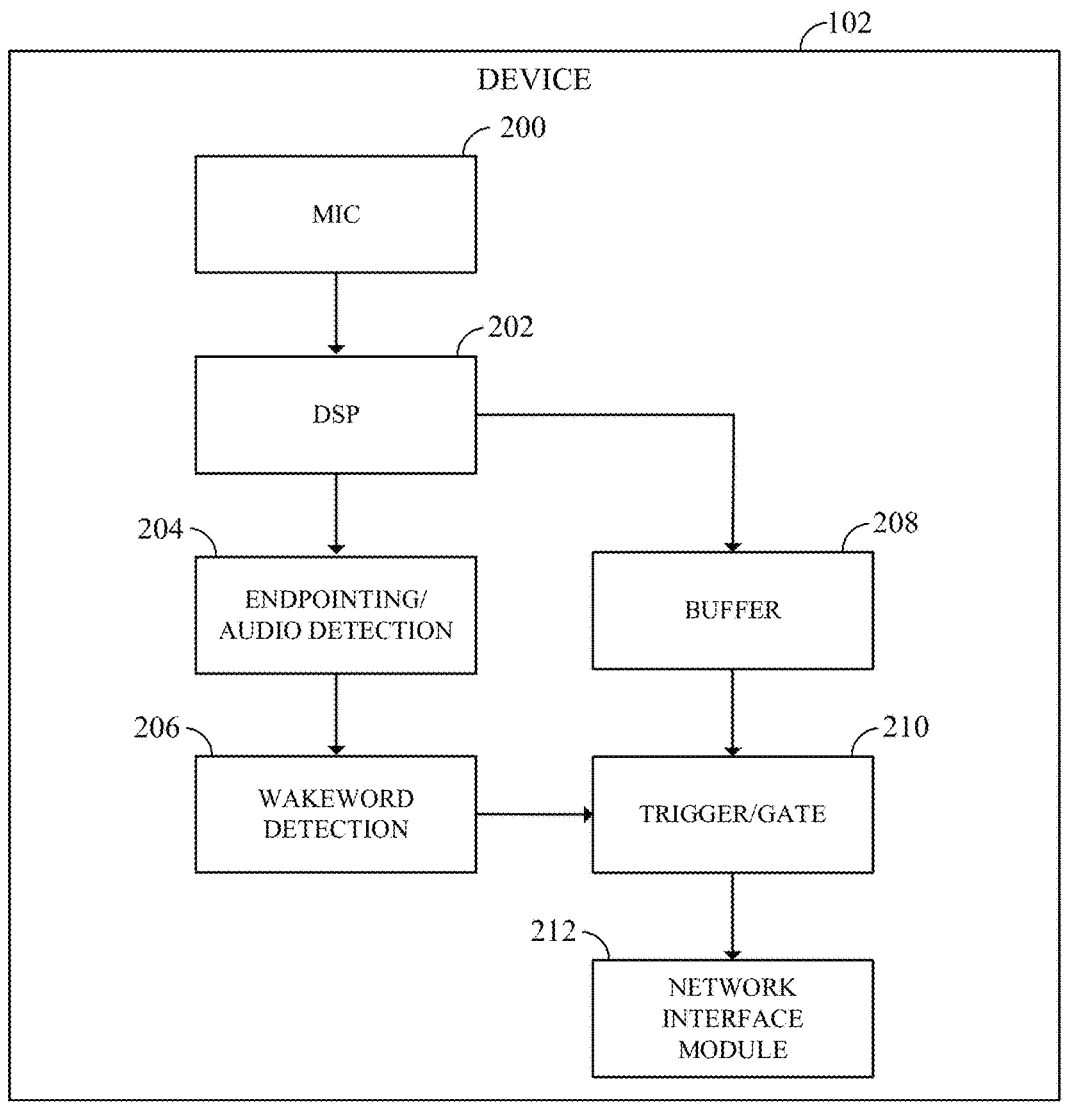
FIG. 2 is a block diagram conceptually illustrating a local device implementing a device-side process for the efficient audio streaming method and apparatus according to one aspect of the present disclosure.

A device implementing a client process according to one aspect of the present disclosure is illustrated in a block diagram in FIG. 2. The local device 102 includes a microphone 200 receiving sound from a source external to the local device. The microphone 200, as is well known in the art, produces electrical signals as a function of the audio or sounds imposed upon it. The electrical signals produced by the microphone 200 may be digital signals or analog signals to be converted to digital by an analog to digital converter (A/D—not shown) as known in the art.

The audio signals from the microphone are received by a Digital Signal Processor (DSP) 202 for processing. The DSP processing of the audio signal is consistent with processing desirable to optimize an audio stream for speech recognition and may include one or more of reverberation, beamforming, echo cancellation and other audio signal processing techniques. In some implementations it may be desirable to limit the amount of signal processing at the local device 102, in which case little or no signal processing would be performed prior to a determination that speech is present to be transmitted. It should be appreciated that it may be desirable to transmit artifacts or information from the signal processing along with the audio stream over the network 106 to the server 105. More information on such an implementation may be found in U.S. patent application Ser. No. 13/562,476, entitled "TRANSMISSION OF NOISE PARAMETERS FOR IMPROVING AUTOMATIC SPEECH RECOGNITION," filed on Jul. 31, 2012, the disclosure of which is hereby incorporated by reference herein in its entirety.

The audio signal that may be subjected to signal processing by the DSP 202 is processed by an endpointing/audio detection module 204. Audio detection processing may be performed to determine an energy level of the audio input. In some embodiments, the endpointing/audio detection module 204 may include a low-power digital signal processor (or other type of processor) configured to determine an energy level (such as a volume, intensity, amplitude, etc.) of an obtained audio input and for comparing the energy level of the audio input to an energy level threshold. The energy level threshold may be set according to user input, or may be set by a device. In some embodiments, the endpointing/audio detection module 204 may be further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored. The endpointing/audio detection module 204 may compare the energy level to the energy level threshold (and optionally to the threshold duration) to determine whether the energy level threshold is met.

If the endpointing/audio detection module 204 determines that the obtained audio input has an energy level satisfying an energy level threshold it may process audio input to determine whether the audio input includes speech. In some embodiments, the endpointing/audio detection module 204 works in conjunction with the DSP 202 (or another processor or low power DSP) to implement one or more techniques to determine whether the audio input includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the endpointing/audio detection module 204 implements a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models, which acoustic models may include models corresponding to speech, noise (such as environmental noise or background noise), or silence. Still other techniques may be used to determine whether speech is present in the audio input.

In a first phase of speech detection, using various ones of the techniques described above, the endpointing/audio detection module 204 may determine a confidence level whose value corresponds to a likelihood that speech is actually present in the audio input. If the confidence level satisfies a confidence level threshold, it may be determined that speech is present in the audio input. However, if the confidence level does not satisfy the confidence level the endpointing/audio detection module 204 may determine that there is no speech in the audio input.

The endpointing/audio detection module 204 may communicate its determination as to whether speech is present in the audio input, optionally, to a wakeword detection module 206. More information on implementations for wakeword detection may be found in U.S. patent application Ser. No. 13/711,510, entitled "SPEECH RECOGNITION POWER MANAGEMENT", filed on Dec. 11, 2012, the disclosure of which is hereby incorporated by reference herein in its entirety. If speech is present in the audio input, a wakeword detection module 206 may be activated. If speech is not present in the audio input, the wakeword detection module 206 is not activated. The wakeword detection module 206 may process the audio input to determine whether a wakeword is included in the speech. In some embodiments, the wakeword detection module 206 includes a microprocessor configured to detect a wakeword (or sleepword). The wakeword detection module 206 may be configured to detect the wakeword using HMM techniques, GMM techniques, or other speech recognition techniques.

The wakeword detection module 206 additionally includes functionality for performing endpointing operations for the purpose of opening a network connection and thereby sending speech to the server. For example, the wakeword detection module 206 may be able to separate speech that incidentally includes a wakeword from a deliberate utterance of the wakeword by determining whether the wakeword was spoken immediately before or after one or more other phonemes or words. Using any of various techniques described herein, the wakeword detection module 206 may determine a confidence level whose value corresponds to a likelihood that a wakeword is actually present in the speech. If the confidence level satisfies a confidence level threshold, it is determined that the wakeword is present in the speech. However, if the confidence level does not satisfy the confidence level threshold, it is determined that there is no wakeword in the speech. It should be appreciated that although use of a wakeword is discussed as a way for determining that voice activity that has been detected is directed to the device, other approaches may be implemented for determining that the voice activity is directed to the local device, such as some aspect of the user interface enabling that determination (e.g., via a button push).

In parallel with the determination of the presence of speech by the endpointing/audio detection module 204 and determination of the presence of the wakeword by the wakeword detection module 206, a memory buffer 208 is configured to capture audio input from the DSP 202. If the endpointing/audio detection module 204 determines a confidence level whose value corresponds to a likelihood that speech is actually present in the audio input, the audio stream is input from the DSP 202 to the buffer 208 in a first stage of speech detection.

The client process 100 may be configured with a gate or trigger 210. If the wakeword is detected, all the audio/speech from the buffer 208, including the beginning of the wakeword, is captured to be sent to the server via the network 106. When the wakeword is detected, the gate or trigger 210 is opened and all buffered audio is sent over the network 106 to the server 105, along with the current streaming audio.

The first phase of speech detection by the endpointing/audio detection module 204 described above, i.e. identification of an utterance, facilitates buffering of the beginning of speech prior to detection of the wakeword. That preliminary buffering enables proactive alerting of server resources that will be involved in the speech recognition processing of that speech, and in particular the wakeword, that speech for processing may be on its way to the server 105. In this manner, the local device may prepare the server, even before the wakeword has been detected, to provision resources for speech recognition and for wakeword validation. Further, proactive alerting by the local device 102 of the speech recognition resources on the server 105 permits early validation of the wakeword by the server as detected by the local device, so that the server may feedback information to the local device should there be faulty detection of the wakeword. That is, during early wakeword validation the server may determine that the wakeword was not in fact detected, and may communicate with the local device to adjust the detection mechanisms in the Endpointing/Audio Detection module 204 and/or wakeword detection module 206. For example, the server 105 may communicate with the client process, or more particularly the Endpointing/Audio Detection module 204 to adjust the confidence level whose value corresponds to a likelihood that a wakeword is actually present in the speech.

The memory buffer module 208 may include one or more memory buffers configured to store digital audio input from the DSP 202. The one or more memory buffers of the memory buffer module 208 may include hardware memory buffers, software memory buffers, or both. The one or more memory buffers may have the same capacity, or different capacities. In some embodiments, the memory buffer module 208 may include a ring buffer, in which audio input may be recorded and overwritten in the order that it is obtained by the DSP 202.

A network interface module 212, when activated, may provide connectivity to the server 105 or servers over one or more wired or wireless networks 106. Upon its activation, the network interface module 212 may transmit the received audio input recorded to the memory buffer module 208 over the network 106 to the remote server 105, such as a speech recognition server described hereinafter. The remote server 105 may return recognition results (e.g., a transcription or response to an intelligent agent query) to the local device 102.

The modules of the client process 100 may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated micro-processing hardware. One or more modules may also be embodied in software implemented by a processing unit. Further, one or more of the modules may be omitted from the client process 100 entirely.

The local device 102, and the memory buffer 208, generally include RAM, ROM, and/or other persistent or non-transitory computer-readable storage media. The local device 102 also includes a user interface module (not shown) configured to present a user interface via a display of the local device 102. The user interface module may be further configured to process user input received via a user input device (not shown), such as a mouse, keyboard, touchscreen, keypad, etc., as is well known in the art. The user interface presented by the user interface module may provide a user with the opportunity to customize the operation of the local device 102 and/or client process 100 according to the disclosure, and/or other operations implemented by the local device 102. The memory may additionally store an operating system that provides computer program instructions for use by the processing unit in the general administration and operation of the local device 102. The memory can further include computer program instructions that an application processing module and/or processing unit in the local device 102 executes in order to implement one or more embodiments of a speech recognition system with distributed endpointing according to the disclosure. The local device 102 may use speech recognition concepts running as computer program instructions on a processing unit in the local device 102 to implement endpointing in the device-side processing as described above. In some embodiments, the local device 102 may further include an automatic speech recognition engine (not shown) that may be implemented by the processing unit to perform the functionality described with respect to FIG. 2 in the local device 102.

Figure 3:
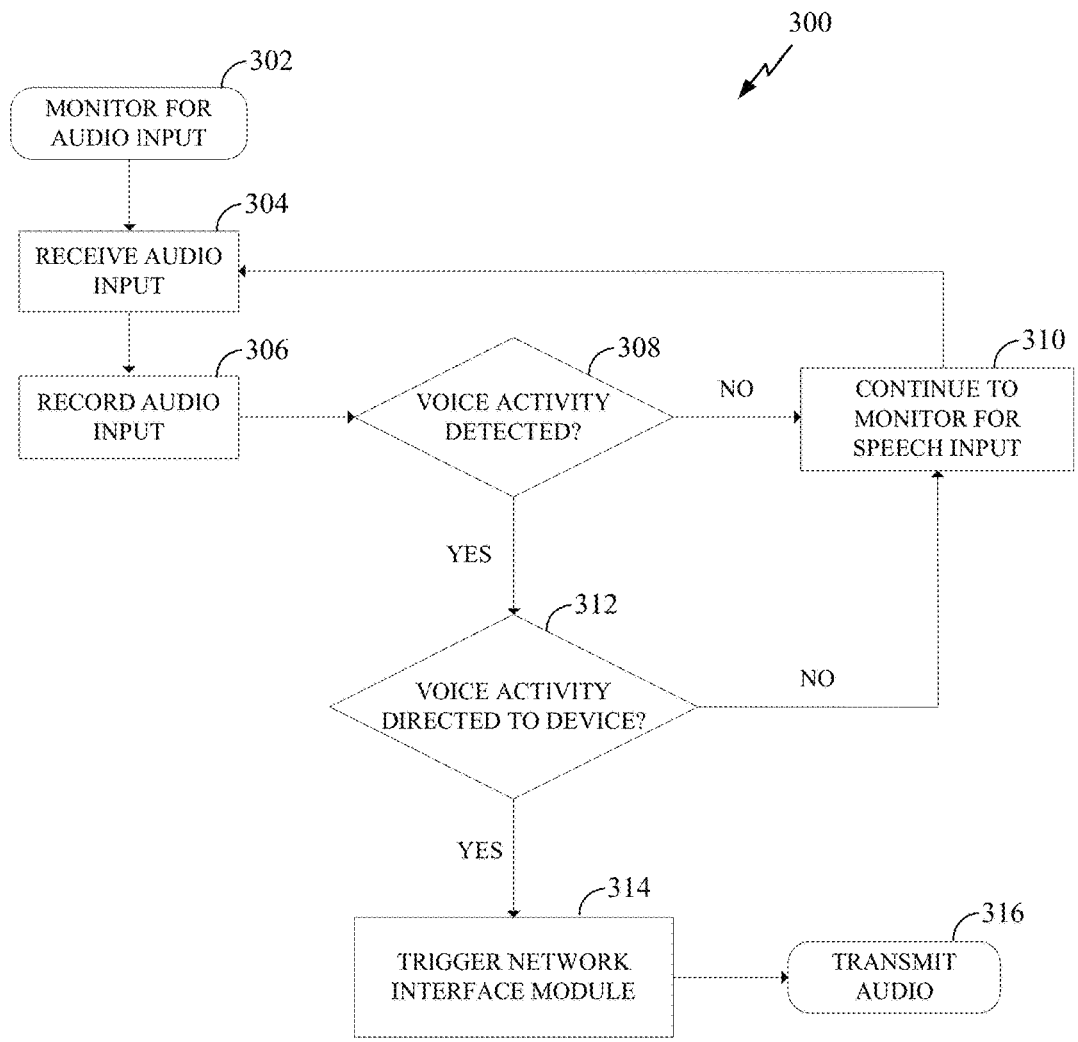
FIG. 3 is a flow diagram conceptually illustrating a device-side process for the efficient audio streaming method and apparatus according to one aspect of the present disclosure.

Referring now to FIG. 3, a flow diagram conceptually illustrates a local device-side process for the efficient audio streaming method and apparatus according to one aspect of the present disclosure. An illustrative routine 300 is shown for processing an audio input which may begin by monitoring for audio input at block 302 and continue as the microphone 200 receives the audio input at block 304. The audio input is processed by the DSP 202 as described above. At block 306, the received/processed audio input may be recorded to the memory buffer module 208. At block 308, the endpointing/audio detection module 204 may determine whether voice activity is detected, such as by determining whether the audio input has an energy level that satisfies an energy level threshold (and, optionally, whether the audio input has an energy level that satisfies an energy level threshold for at least a threshold duration). If the audio input's energy level does not satisfy the energy level threshold, the audio input module 208 may continue to monitor for speech audio input in block 310 until another audio input is received.

Returning to block 308, if the endpointing/audio detection module 204 determines that the audio input has an energy level satisfying a threshold (e.g. speech is detected) a further determination is made, such as by the wakeword detection module 206, whether the detected voice activity is directed to the local device 312, e.g., whether a wakeword is present in the speech. If the wakeword detection module 206 determines that the wakeword is not present in the speech (or not likely to be present in the speech), then the audio input may continue to be monitor, in block 310, until another audio input is received.

Returning to block 312, if, in some embodiments, the wakeword detection module 206 determines that the wakeword is present in the speech, the speech may be optionally processed to determine, for example by the wakeword detection module 206, whether the speech is associated with a particular user (e.g., whether the wakeword was spoken by the user). If the speech is not associated with the particular user, the audio input process 102 may then continue to monitor for audio input, in block 310, until another audio input is received.

If the voice activity is directed to the device, or wakeword is detected, in block 312 (and optionally the speech is associated with the particular user), the illustrative routine 300 may proceed to block 314 and trigger the network interface module 212. With the network interface module 212 triggered, the audio input recorded to the memory buffer module 208 may be transmitted 316 over the network 106.

In some embodiments, while the network interface module 212 is triggered, subsequently obtained audio inputs are provided directly over network 106 via the network interface module 212 to the server 105. However, in other embodiments, any or all of the DSP 202, endpointing/audio detection module 204 and wake detection module 206 may process the audio input before providing it to the network interface module 206 to be transmitted over the network 106 to the server 105.

In some embodiments, not shown, the client process 102 waits until the server 105 returns a confirmation that the wakeword is present in the first speech/audio input to transmit subsequent audio inputs for recognition. If no confirmation of the wakeword is provided by the server 105, or if a deactivation instruction is received from the server 105 via the network interface module 212, the network interface module 212 may be deactivated and/or the network connection terminated.

As many of the operations of the client process 102 may generate probabilistic rather than exact determinations, errors may occur during the illustrative routine 300. In some instances, a particular module may provide a "false positive." For example, the endpointing/audio detection module 204 may incorrectly determine that speech is present based on an energy threshold being met at block 308, or the wakeword detection module 206 may incorrectly determine that the speech is directed to the device or includes the wakeword at block 312 (or that the speech belongs to the user). Adaptive thresholding and cross-validation among the modules of the client process 102, and the server process as discussed in more detail below, may be advantageously used to reduce false positives. For example, the server process 104 or speech recognition server 105 may direct the endpointing/audio detection module 204 to increase its confidence level threshold for determining that speech is present in the audio input, so as to reduce future false positives. Likewise, the server process 104 or speech recognition server 105, which includes speech recognition capabilities, may transmit to the local device 102 or client process 100 an indication that, for example, no wakeword was present in the speech, even though the wakeword detection module 206 may have indicated that the wakeword was present. Accordingly, the confidence level threshold of the wakeword detection module 206 for determining that the wakeword is present in the speech may be increased, so as to reduce future false positives. Further, a user interface may be provided so that a user may increase one or more confidence level thresholds to reduce false positives.

In other instances, a particular component may provide a "false negative," such that although the wakeword is present the network interface module 206 is not activated and/or no network connection effected. For example, the endpointing/audio detection module 204 may incorrectly determine that no speech is present, or the wakeword detection module 206 may incorrectly determine that the speech does not include the wakeword (or that the speech does not belong to the user). To reduce the likelihood of false negatives, client process 100 and/or local device 102 may periodically lower the threshold confidence levels, e.g., lower the value of a confidence level required to satisfy the thresholds in blocks 308 and/or 312. The threshold may continue to be lowered until one or more false positives are obtained, as described above. Once one or more false positives are obtained, the threshold may not be lowered further, or may be slightly increased. Further, a user interface may accordingly be provided so that a user may decrease one or more confidence level thresholds to reduce false negatives, or other cross-validation techniques known to those skilled in the art could be implemented.

If speech is present 308 and directed to the device, or the wakeword is detected 312, the network interface module 212 effects transmission of the audio 316 over the network 106 to the server 105 comprising an automated speech recognition server implementing the server process 104.

Figure 4:
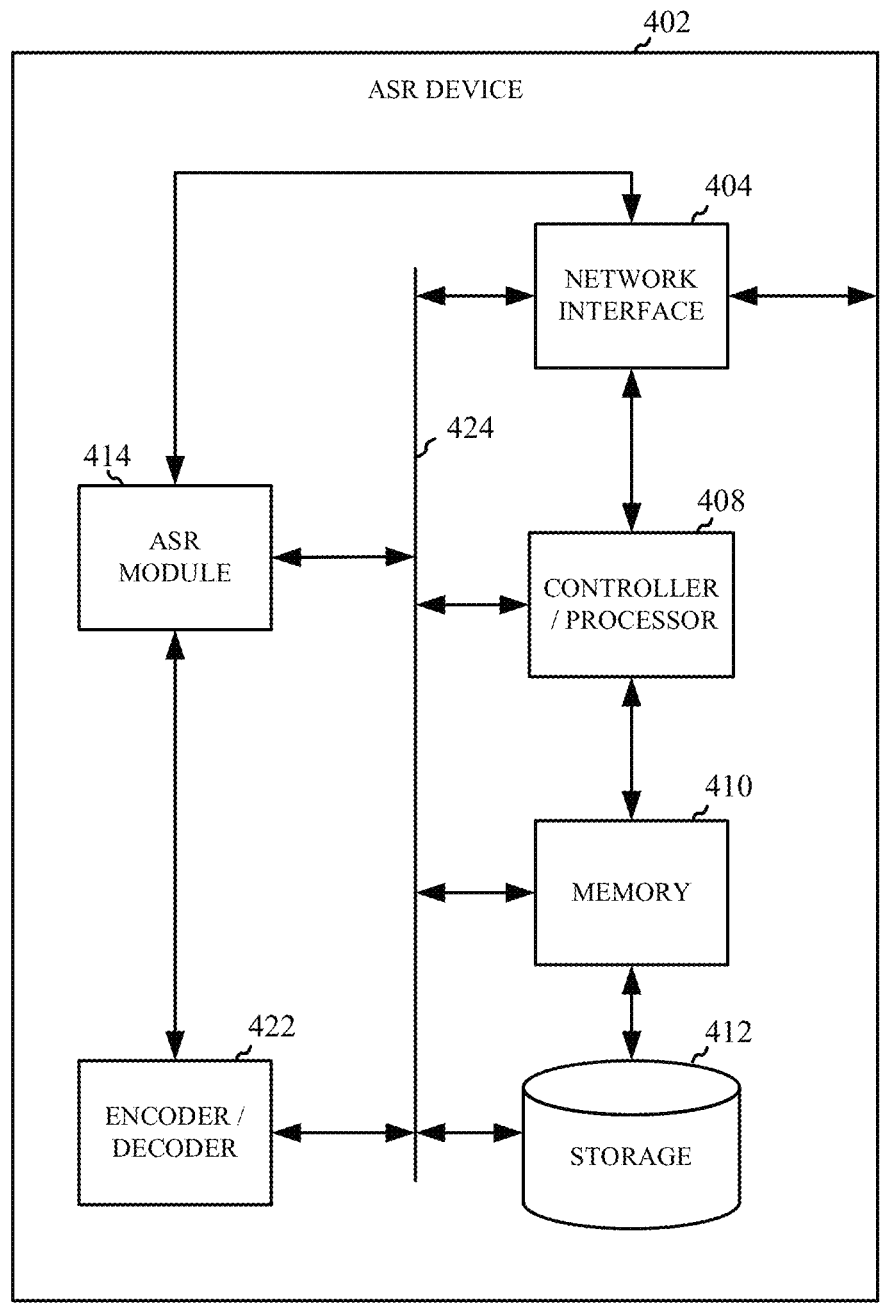
FIG. 4 is a block diagram conceptually illustrating an automated speech recognition device implementing a server-side process for the efficient audio streaming method and apparatus according to one aspect of the present disclosure.

Referring now to FIG. 4, the server 105 may comprise an automated speech recognition (ASR) device 402 for implementing the server process 104 and performing speech recognition. Aspects of the present disclosure include computer-readable and computer-executable instructions that may reside on the ASR device 402. FIG. 4 illustrates a number of components that may be included in the ASR device 402, however other non-illustrated components may also be included. Also, some of the illustrated components may not be present in every device capable of employing aspects of the present disclosure. Further, some components that are illustrated in the ASR device 402 as a single component may also appear multiple times in a single device. For example, the ASR device 402 may include multiple input/output devices 406 or multiple controllers/processors 408.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 4 is exemplary, and may be a stand-alone device or may be included, in whole or in part, as a component of a larger device or system.

As illustrated in FIG. 4, the ASR device 402 may include an ASR network interface 404 for interfacing with the network 106 and receiving speech/audio from the local device 102 and capturing spoken utterances for processing. The ASR network interface 404, like the network interface module 212 of the local device 102, when activated, may provide connectivity over one or more wired or wireless networks. Upon its activation, the ASR network interface 404 may receive audio from, or transmit signals to, the local device 102 over the network 106. The ASR device 402 may return recognition results (e.g., a transcription or response to an intelligent agent query) to the local device in which the local device network interface module 206 is included, whereupon the network interface module 206 may provide the received recognition results to the local device for processing.

The ASR network interface 404 may be integrated into the ASR device 402 or may be separate from the ASR device 402. The ASR device 402 may also include an address/data bus 424 for conveying data among components of the ASR device 402. Each component within the ASR device 402 may also be directly connected to other components in addition to (or instead of) being connected to other components across the bus 424. Although certain components are illustrated in FIG. 4 as directly connected, these connections are illustrative only and other components may be directly connected to each other (such as an ASR module 414 to the controller/processor 408).

The ASR device 402 may include a controller/processor 408 that may be a central processing unit (CPU) for processing data and computer-readable instructions and a memory 410 for storing data and instructions. The memory 410 may include volatile random access memory (RAM), non-volatile read only memory (ROM), and/or other types of memory. The ASR device 402 may also include a data storage component 412, for storing data and instructions. The data storage component 412 may include one or more storage types such as magnetic storage, optical storage, solid-state storage, etc. The ASR device 402 may also be connected to removable or external memory and/or storage (such as a removable memory card, memory key drive, networked storage, etc.) through the input/output device 406. Computer instructions for processing by the controller/processor 408 for operating the ASR device 402 and its various components may be executed by the controller/processor 408 and stored in the memory 410, storage 412, external device, or in memory/storage included in the ASR module 414 discussed below. Alternatively, some or all of the executable instructions may be embedded in hardware or firmware in addition to or instead of software. The teachings of this disclosure may be implemented in various combinations of software, firmware, and/or hardware, for example.

In addition to the network interface 404, the ASR device 402 may include input/output device(s) (not shown). A variety of input/output device(s) may be included such as a microphone, a touch input device, keyboard, mouse, stylus or other input device. Example output devices include a visual display, tactile display, audio speakers, headphones, printer or other output device. The input/output device may also include an interface for an external peripheral device connection such as universal serial bus (USB), FireWire, Thunderbolt or other connection protocol. The input/output device may also include a network connection such as an Ethernet port, modem, etc. The input/output device may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device(s) the ASR device 402 may connect to a network, such as the Internet or private network, which may include a distributed computing environment. It should be appreciated that the foregoing, and other, input/output devices may be implemented as well on the remote server 105 and/or local device 102, The ASR device 402 may also include an ASR module 414, for example, for processing spoken audio data, such as into text. The ASR module 414 may identify speech and transcribe audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 414 which then interprets the utterance based on the similarity between the utterance and models known to the ASR module 414. For example, the ASR module 414 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model or dialog-based interactive voice response (IVR) system). Based on the considered factors and the assigned recognition score, the ASR module 414 may output speech recognition results including the most likely words recognized in the audio data. The ASR module 414 may also output speech recognition results including multiple alternative recognized words in the form of a lattice or an N-best list.

The ASR module 414 may be connected to the bus 424, input/output device(s) 406, network interface 404, encoder/decoder 422, controller/processor 408 and/or other component of the ASR device 402. Audio data sent to the ASR module 414 may come from the network interface 404 or may be received by an input/output device, such as audio data captured by the local device 102 and sent to the ASR device 402 over the network 106.

The ASR module 414 may include an acoustic front end (AFE) and a speech recognition engine. The AFE transforms audio data into data for processing by the speech recognition engine. The speech recognition engine compares the speech recognition data with the acoustic, language, and other data models and information for recognizing the speech contained in the original audio data.

The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. The speech recognition engine may process the output from the AFE with reference to information stored in speech storage. Alternatively, post front-end processed data (such as feature vectors) may be received by the ASR module 414 from another source besides the internal AFE. For example, another entity, such as the local device 102, may process audio data into feature vectors and transmit that information to the ASR device 402 through the input/output device(s) or ASR network interface 404. Feature vectors may arrive at the ASR device 402 encoded, in which case they may be decoded (for example by the encoder/decoder 422) prior to processing by the speech recognition engine. The speech recognition engine attempts to match received feature vectors to language phonemes and words as known in the speech storage. The speech recognition engine computes recognition scores for the feature vectors based on acoustic information and language information. The acoustic information is used to calculate an acoustic score representing a likelihood that the intended sound represented by a group of feature vectors match a language phoneme. The language information is used to adjust the acoustic score by considering what sounds and/or words are used in context with each other, thereby improving the likelihood that the ASR module outputs speech results that make sense grammatically.

The speech recognition engine may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the ASR module 414 to another component of the ASR device 402, such as the controller/processor 408 for further processing (such as execution of a command included in the interpreted text) or to the input/output device 406 for sending to an external device. Thus speech recognition results may also include a command for ultimate execution by another application.

Figure 5:
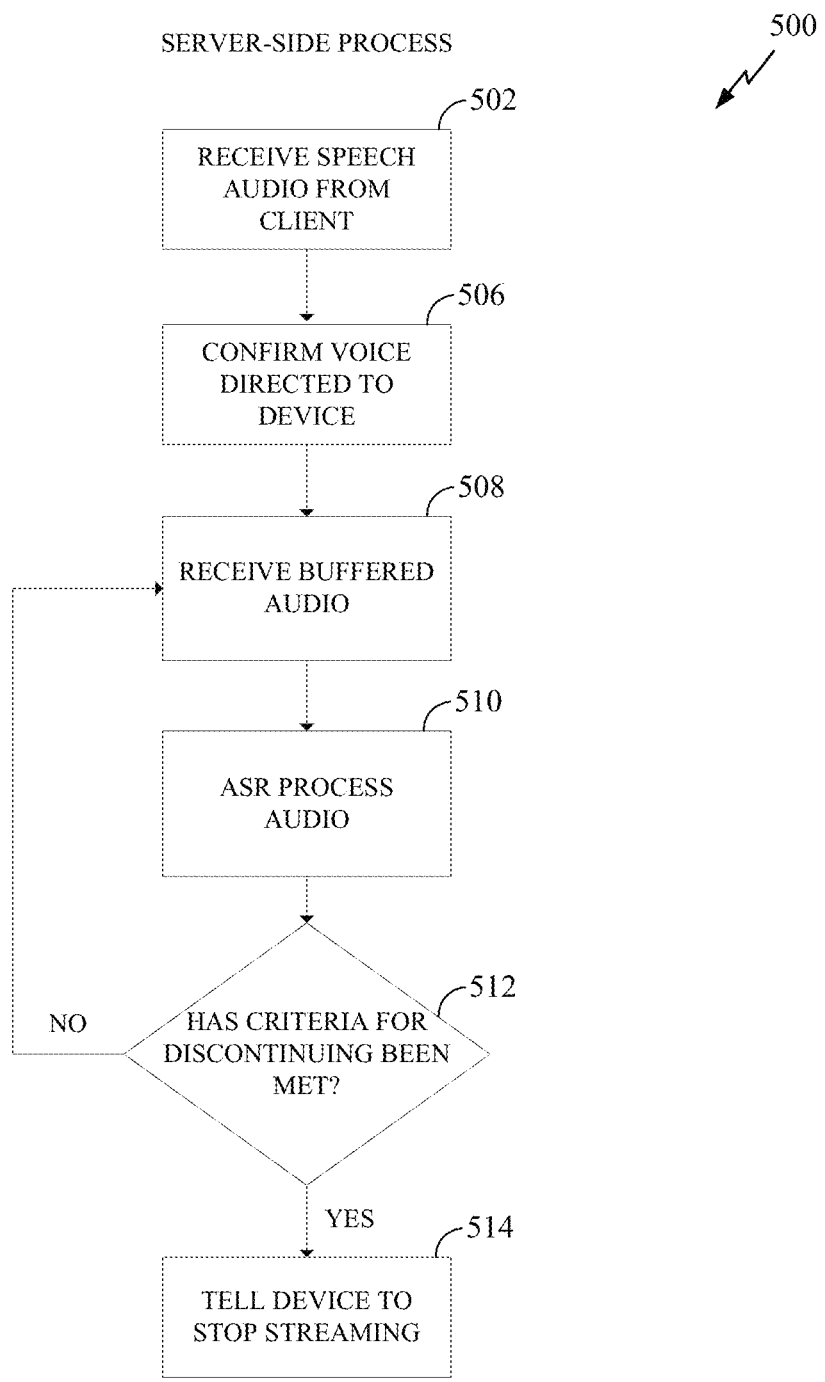
FIG. 5 is a flow diagram conceptually illustrating a server-side process for the efficient audio streaming method and apparatus according to one aspect of the present disclosure.

The functionality of a server-side process implementing distributed endpointing according to the disclosure is illustrated in the flow chart of FIG. 5. A server-side process 500 running on the ASR server 105, as described above, receives speech audio 502 from the local device 102 as detected on the local device. When the client process 100 has determined the presence of speech directed to the device (or optionally the wakeword) it begins streaming audio including the buffered speech to the server via the network 106. the server initially confirms 506 that the speech is directed to the local device 102, or if a wakeword is involved the presence of the wakeword is confirmed through a wakeword validation process. The server may feedback information to the local device should there be faulty detection resulting in transmission of speech from the local device 102 to the remote server 105.

The client process 100 continues streaming audio and the server 105 continues receiving the buffered audio 508 until disconnect criteria or failsafe conditions are met. Received audio is subjected to ASR processing 510 by the ASR device 402 as described. The server process may be configured to implement one or more criteria for discontinuing the stream of audio/speech coming from the local device 102, and the server process will determine if the criteria for discontinuing has been met 512. The disconnect criteria that the server uses to determine that the speech stream has stopped, or that streaming audio from the local device 102 should stop, may include a determination that speech in the audio stream has stopped 116, an end of interaction indication or "sleepword" (EOII) 118 was in the stream, or that there was a substantial reduction in the energy level of the speech 120.

In determining that the speech stream has stopped 116 or that there has been substantial reduction in the energy level of the speech 120, the ASR server 402 may use the thresholding techniques described above. In some embodiments, the ASR module 414 may implement one or more techniques to determine whether the audio input includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In some embodiments, the ASR module 414 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage 420, which acoustic models may include models corresponding to speech, noise (such as environmental noise or background noise), or silence. Still other techniques may be used to determine whether speech is present in the audio input.

In determining that the audio stream included an end of interaction indication (EOII) 118 or sleep word, several techniques may also be used. For example, the ASR module 414 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 414 may output the most likely words recognized in the audio data for comparison against the EOII word or sleepword stored in memory 410 or storage 412.

As mentioned, other criteria for discontinuing the audio stream based on endpointing distributed between the local device 102 and server 105 may be defined.

Until the determined criteria has been met, the ASR device 402 in the server 105 continues to process audio, as shown in block 510, from the local device 102. The server process 500 continues to look for criteria indicating that the audio stream should be discontinued 512. If/when the server process 500 determines that one (or more) of the disconnect criteria have been met, the server 105 will send a communication to the client process 100 to stop streaming audio 514 over the network 106.

Figure 6:
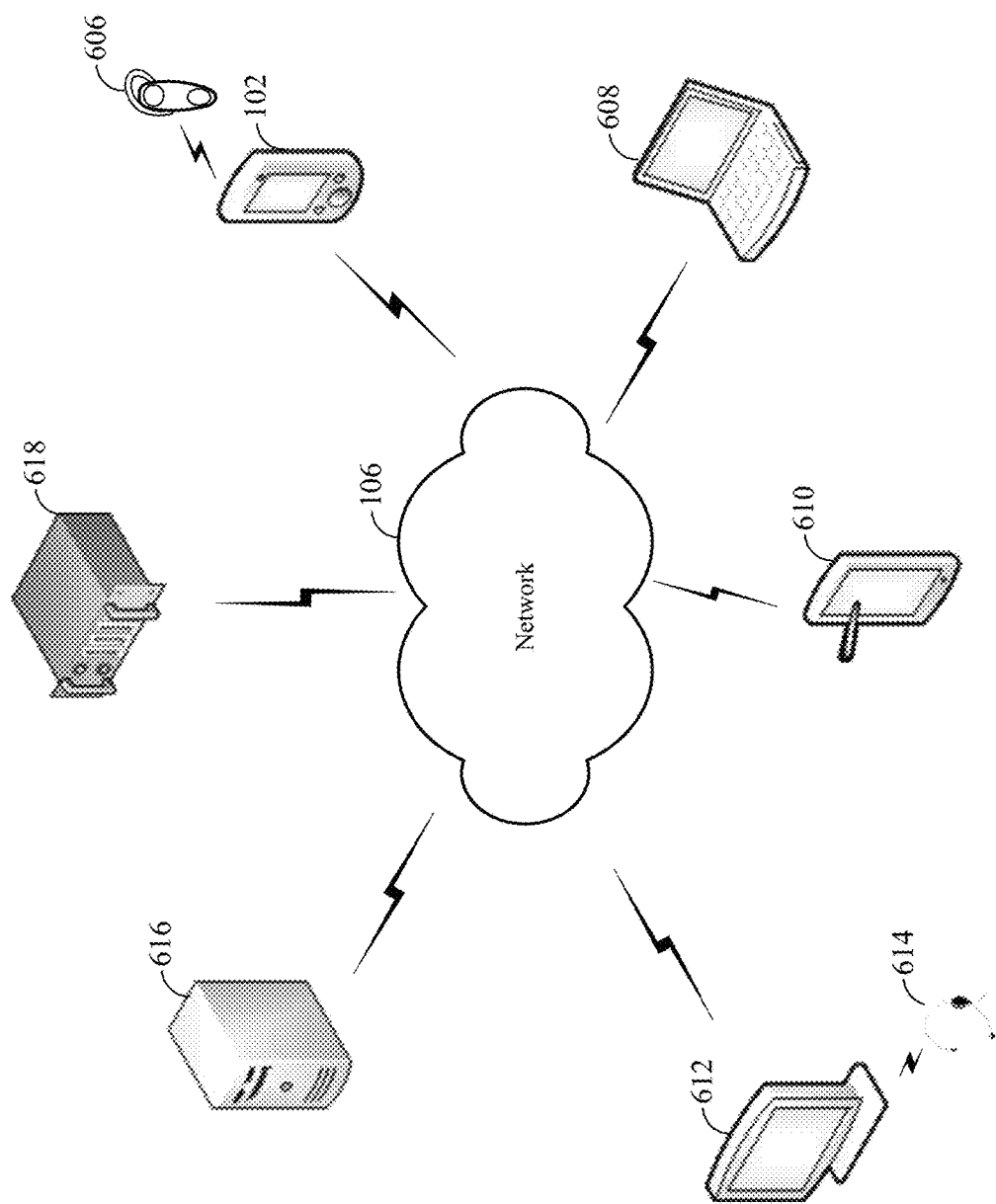
FIG. 6 illustrates a computer network for use with distributed speech recognition according to one aspect of the present disclosure.

Multiple devices, including multiple local devices 102 and ASR devices 402 may be connected over the network 106, as shown in FIG. 6. Network 106 may include a local or private network or may include a wide network such as the internet. Devices may be connected to the network 106 through either wired or wireless connections. For example, a wireless local device 102 may be connected to the network 106 through a wireless service provider. Other devices, such as computer 612, may connect to the network 106 through a wired connection. Other devices, such as laptop 608 or tablet computer 610 may be capable of connection to the network 106 using various connection methods including through a wireless service provider, over a WiFi connection, or the like. Networked devices may input spoken audio through a number of audio input devices including through a headset 606 or 614. Audio input devices may be connected to networked devices either through a wired or wireless connection. Networked devices may also include embedded audio input devices, such as an internal microphone (not shown) in the laptop 608, wireless device 102 or tablet computer 610.

In certain ASR system configurations, one device may capture an audio signal and another device may perform the ASR processing. For example, audio input to the headset 606 may be captured by local device 102 and sent over the network 106 to computer 616 or illustrated server 618 for processing. Or, as described above, local device 102 may partially process the audio signal before sending it over the network 106 to the server for further processing. Because ASR processing may involve significant computational resources, in terms of both storage and processing power, such split configurations may be employed where the device capturing the audio has lower processing capabilities than a remote (e.g. server) device and higher quality ASR results are desired. The audio capture may occur near a user and the captured audio signal sent to another, remote, device for processing.

Thus the teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 402 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

Additionally, it should be noted that in some embodiments, the functionality of the client or local device 102 and/or speech recognition server or ASR device 402 may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. One or more of the computing devices of the hosted computing environment may include distributed endpointing as discussed above.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage. Further, although "speech" or "voice" activity are discussed, it should be appreciated that the system and methods of the disclosure may be implemented such that speech or voice activity may include any activity that is not silence or background noise, for example speech/voice activity may include music.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), graphics processing unit or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise. Depending on the embodiment, certain acts, events, or functions of any of the routines or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for performing distributed speech recognition, the system comprising:
  a local device comprising at least one processor coupled to a memory, the memory including instructions operable to be executed by the processor to perform a set of actions, configuring the processor:
    to receive audio using at least one microphone;
    to monitor audio data corresponding to the audio to detect voice activity in the audio data,
    to determine that the audio data comprises a wakeword,
    to begin transmission of the audio data to a server device in response to determining the audio data comprises the wakeword,
    to receive, from the server device, a confirmation that the audio data includes the wakeword,
    to receive, from the server device, an indication to stop the transmission of the audio data;
    to stop the transmission of the audio data in response to receiving the indication; and
    to continue to receive further audio using the at least one microphone following receipt of the indication;
  the server device comprising at least one processor coupled to a memory, the memory including instructions operable to be executed by the processor to perform a set of actions, configuring the processor:
    to begin receiving the audio data,
    to confirm the wakeword in the audio data,
    to transmit the confirmation to the local device,
    to determine an end of the voice activity in the audio data, and
    to transmit the indication to the local device in response to determining the end of the voice activity.

2. The system of claim 1, wherein the processor of the local device is further configured to determine that the audio data includes the wakeword using Hidden Markov Model (HMM) techniques.

3. The system of claim 1, wherein the local device processor configured to monitor the audio data to detect the voice activity in the audio data comprises the local device processor further configured to detect the voice activity by evaluating quantitative aspects of the audio data selected from a group consisting of: spectral slope between one or more frames of the audio data, energy levels of the audio data in one or more spectral bands, and signal-to-noise ratios of the audio data in one or more spectral bands.

4. A computer-implemented method, comprising:
  receiving, by a local device, audio using at least one microphone;
  monitoring, by the local device, audio data corresponding to the audio to detect voice activity in the audio data;
  determining, by the local device, that the audio data comprises a wakeword;
  starting, by the local device, transmission of the audio data to a remote device in response to determining the audio data comprises the wakeword;
  receiving, by the local device, a confirmation from the remote device that the transmitted audio data includes the wakeword;
  receiving, by the local device, an indication to stop the transmission of the audio data, from the remote device, in response to the remote device determining an end of the voice activity in the audio data;
  stopping, by the local device, the transmission of the audio data in response to receiving the indication;
  continuing to receive further audio using the at least one microphone following receipt of the indication.

5. The method of claim 4, wherein monitoring, by the local device, the audio data comprises determining a likelihood that the voice activity is present in the audio data by evaluating quantitative aspects of the audio data selected from a group consisting of: spectral slope between one or more frames of the audio data, energy levels of the audio data in one or more spectral bands, and signal-to-noise ratios of the audio data in one or more spectral bands.

6. A computing device, comprising:
  a processor;
  a memory device including instructions operable to be executed by the processor to perform a set of actions, configuring the processor:
    to receive audio using at least one microphone;
    to monitor audio data corresponding to the audio to detect voice activity in the audio data;
    to determine that the audio data comprises a wakeword;
    to start transmission of the audio data to a remote device in response to determining the audio data comprises the wakeword;
    to receive, from the remote device, a confirmation that the transmitted audio data includes the wakeword;
    to receive an indication to stop the transmission of the audio data, from the remote device, in response to the remote device determining an end of the voice activity in the audio data;
    to stop the transmission of the audio data in response to receiving the indication; and
    to continue to receive further audio using the at least one microphone following receipt of the indication.

7. The computing device of claim 6, wherein the processor configured to monitor the audio data to detect the voice activity in the audio data comprises the processor configured to determine a likelihood that speech is present in the audio data.

8. The computing device of claim 6, wherein the processor is further configured to receive, from the remote device, speech recognition results based on the voice activity.

9. The computing device of claim 6, wherein the processor is further configured to stop the transmission upon expiration of a length of time.

10. The computing device of claim 6, wherein the processor is further configured to detect the voice activity in the audio data by evaluating quantitative aspects of the audio data selected from a group consisting of: spectral slope between one or more frames of the audio data, energy levels of the audio data in one or more spectral bands, and signal-to-noise ratios of the audio data in one or more spectral bands.

* * * * *